United States Patent [19]

Rocklin

[11] 3,784,422
[45] Jan. 8, 1974

[54] 2,3-BIS(DIFLUOROAMINO) PROPYL 2,2-DINITRO-PROPYL CARBONATE, USEFUL IN PROPELLANTS

[75] Inventor: Albert L. Rocklin, Walnut Creek; Walter L. Petty, Moraga, both of Calif.

[73] Assignee: Shell Oil Company, New York, N.Y.

[22] Filed: Oct. 12, 1970

[21] Appl. No.: 81,637

[52] U.S. Cl............. 149/88, 149/19, 149/38, 149/42, 149/44, 260/463
[51] Int. Cl................ C06b 15/00, C06c 69/00
[58] Field of Search............ 149/19, 20, 42, 44, 149/88, 109; 260/463

[56] References Cited
UNITED STATES PATENTS
3,461,162   8/1969   Koshar et al............... 260/463 X

*Primary Examiner*—Leland A. Sebastian
*Attorney*—Henry C. Geller and Howard W. Haworth

[57] ABSTRACT

The novel allyl 2,2-dinitropropyl carbonate and the conversion thereof to the novel 2,3-bis(difluoroamino)propyl 2,2-dinitropropyl carbonate useful as a high energy plasticizer of polymeric binders for solid propellant systems.

5 Claims, No Drawings

2,3-BIS(DIFLUOROAMINO) PROPYL 2,2-DINITRO-PROPYL CARBONATE, USEFUL IN PROPELLANTS

The Invention herein described was made in the course of or under a contract or subcontract thereunder, with the United States Air Force.

CROSS-REFERENCE TO RELATED APPLICATIONS

This application is related to copending application of Albert L. Rocklin, U.S. Ser. No. 81,638, filed of even date.

BACKGROUND OF THE INVENTION

High-energy polymers used as high-energy binders for solid propellant systems are generally viscous liquids which require a plasticizer in order to mix, cast, and cure to propellants with acceptable physical properties. Difluoroamino-containing compounds which are per se energetic have been used as plasticizers. Since difluoramino compounds tend to be highly sensitive to shock and friction, it would be advantageous to minimize this unwelcome contribution to the hazards of propellant formulation by having available a highly energetic difluoramino plasticizer having reduced shock and friction sensitivity. It would be of further advantage to obtain a plasticized high-energy binder polymeric composition, i.e., a composition of polymer containing said plasticizer, which has improved properties and improved performance in cured systems.

SUMMARY OF THE INVENTION

It has now been found that the novel 2,3-bis(difluoramino)propyl 2,2-dinitropropyl carbonate is a highly energetic nitro-difluoramino plasticizer having greatly reduced shock and friction sensitivity. The novel composition of the invention, 2,3-bis(difluoramino)propyl 2,2-dinitropropyl carbonate, of the formula

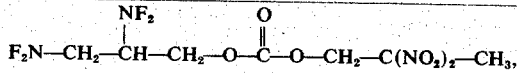

$$F_2N-CH_2-CH(NF_2)-CH_2-O-C(O)-O-CH_2-C(NO_2)_2-CH_3,$$

is produced advantageously by the reaction of the novel allyl 2,2-dinitropropyl carbonate, which is advantageously not shock-sensitive, with tetrafluorohydrazine, $N_2F_4$. The novel reactant, allyl 2,2-dinitropropyl carbonate, is itself produced advantageously by the reaction of 2,2-dinitropropanol with allyl chloroformate in the presence of pyridine.

PREFERRED EMBODIMENTS OF THE INVENTION

The novel 2,3-bis(difluoramino)propyl 2,2-dinitropropyl carbonate is a mixed carbonate of two different alcohols, a nitroalcohol (2,2-dinitropropanol) and a difluoraminoalcohol [2,3-bis(difluoramino)-propanol]. Generally, mixed carbonates of two different alcohols are prepared by reaction of one alcohol with the chloroformate of the other. However, the production of the hereinabove carbonate involving the nitro-alcohol and the difluoraminoalcohol and proceeding via the chloroformate of one or the other encounters a number of difficulties, namely, (1) the chloroformate of the nitroalcohol is difficult to prepare by the usual methods, (2) the difluoraminoalcohol is highly shock-sensitive, and (3) the reaction of the nitroalcohol with the chloroformate of the difluoraminoalcohol requires, as hydrogen chloride acceptor, pyridine which is sufficiently basic to destroy difluoramino groups in the difluoraminoalkyl chloroformate. These difficulties have been obviated by reacting 2,2-dinitropropanol with allyl chloroformate to produce the novel allyl 2,2-dinitropropyl carbonate. The allyl 2,2-dinitropropyl carbonate is subsequently reacted with tetrafluorohydrazine to produce the desired 2,3-bis(difluoramino)propyl 2,2-dinitropropyl carbonate.

Allyl chloroformate is conveniently produced in high yield by treatment of allyl alcohol with liquid phosgene. The reaction of allyl chloroformate with 2,2-dinitropropanol is conducted in the presence of pyridine as hydrogen chloride acceptor to produce in high yield allyl 2,2-dinitropropyl carbonate, which can be highly purified by distillation. This reaction is conducted in the presence or in the absence of a liquid organic diluent or solvent. In the modification wherein a diluent is employed, diluents that are suitable are those capable of dissolving the reactants and acid acceptor, and are inert to the reactants and the allyl 2,2-dinitropropyl carbonate prepared therefrom. Exemplary diluents or solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons, such as benzene, toluene and xylene; dialkyl ketones such as acetone, methyl ethyl ketone, methyl isobutyl ketone and diethyl ketone; halogenated hydrocarbons such as dichloromethane, chloroform, carbon tetrachloride, dichloroethane, tetrachloroethylene, bromoform, dibromoethane, chloropropane, bromobutane, 1-chloro-2,2-difluoroethane, chloropentane, chlorobenzene, chlorocyclohexane and the like; sulfoxides such as dimethylsulfoxide, and tertiary amines such as pyridine, triethylamine and N,N-dimethylaniline. The solvent or diluent, if any, is employed in molar excess over the amount of total reactants, and, in general, moles of solvent up to about 150 moles per mole of total reactants are satisfactory. A paticularly preferred group of diluents includes halogenated hydrocarbons of one to six carbon atoms, especially chlorohydrocarbons, and most preferred is 1,2-dichloroethane. The reaction is preferably carried out by adding allyl chloroformate to a 2,2-dinitropropanol-pyridine solution. The reaction requires essentially one mole of pyridine for each mole of 2,2-dinitropropanol reacted with allyl chloroformate. Although two percent in excess of the stoichiometric requirements of pyridine and allyl chloroformate is preferred, a larger excess such as up to ten percent may be used. The temperature at which the reaction is carried out is in the range of from about $-35°C$ to about $25°C$. A preferred temperature range is that of from about $-10°C$ to about $-25°C$; most preferred is a temperature of about $-20°C$.

The addition of tetrafluorohydrazine to allyl 2,2-dinitropropyl carbonate is essentially quantitative and can be accomplished conveniently in a batchwise or continuous manner. The temperature at which the addition is conducted is from about 60°C to about 125°C, preferably at about 105°C. The resulting 2,3-bis(difluoramino)propyl 2,2-dinitropropyl carbonate is purified by conventional means such as fractional distillation, solution chromatography, and the like. A preferred and convenient method of purification, producing a product of purity and stability comparable to that from distillation, is washing with aqueous sodium bicarbonate followed by treatment with an acidic ion exchange resin and with a molecular sieve. The aforementioned addition of tetrafluorohydrazine to allyl 2,2-dinitropropyl carbonate generally is conducted in the presence of an inert solvent and preferably in the presence of an inert, water-immiscible solvent. Exemplary inert, water-immiscible solvents are normally liquid ethers, inclduing dialkyl ethers such as diethyl ether, dibutyl ether, ax emthyl hexyl ether; alkyl aryl ethers such as anisole and pehnyl butyl ether; and lower alkyl ethers (full) of polyhydric alcohols such as glycerol triethyl ether; normally liquid armoatic hydrocarbons, such as benzene, toluene, and xylene; dialkyl ketones such as methyl isobutyl ketone and diethyl ketone; and halogenated hydrocarbons such as dichloromethane, chloroform, carbon tetrachloride, dichloroethane, tetrachloroethylene, bromoform, dibromoethane, chloropropane, bromobutane, 1-chloro-2,2-difluoroethane, chloropentane, chlorobenzene, chlorocyclohexane and the like. The solvent is employed in molar excess over the amount of reactants, and in general, moles of solvent up to about 150 moles per mole of reactants are satisfactory. A particularly preferred group of solvents includes halogenated hydrocarbons of one to six carbon atoms, especially chlorohydrocarbons, and most preferred is 1,2-dichloroethane. Optionally, an inert, water-soluble solvent such as acetone, tetrahydrofuran, dioxane, and the like may be used in the difluoramination step. However, prior to the bicarbonate treatment next described, the water-soluble solvent is exchanged for a water-immiscible solvent by conventional solvent exchange means. The resulting plasticizer solution, for example, 2,3-bis(difluoramino)propyl 2,2-dinitropropyl carbonate in a halogenated hydrocarbon such as 1,2-dichloroethane, is then washed with aqueous sodium bicarbonate, suitably a solution of from about 0.5 to about 5 percent (by weight) of sodium bicarbonate in water. The plasticizer solution is washed or extracted with the bicarbonate solution for a combined contact time of from about 0.1 to about 10 hours. When the process is operated in a batchwise manner, the contacting is conducted preferably in washes or extracts of from 1 to 4 times; when the process is operated continuously, the contacting preferably is conducted counter-currently. The nonaqueous phase resulting therefrom, i.e., the washed or extracted plasticizer solution, is then treated by being contacted with an acidic ion exchange resin such as Amberlyst 15 (Rohm and Haas Company) and a molecular sieve such as 13x molecular sieve. The resulting solution of purified stable 2,3-bis(difluoramino)propyl 2,2-dinitropropyl carbonate can be used with advantage for purposes of storage and/or transport. The purified, stable 2,3-bis(difluoramino)propyl 2,2-dinitropropyl carbonate may be recovered by separating it from the inert, water-immiscible solvent by conventional means such as solvent stripping. By this method of purification purified, stable 2,3-bis(difluoramino)-propyl 2,2-dinitropropyl carboanate may be obtained without the carbonate itself undergoing distillation, which may be hazardous and is an expensive procedure owing to the high boiling point of the carbonate.

By the above-described process, 2,2-dinitropropanol can be converted to the desired carbonate derivative without having to subject the difluoramino compound to damaging pyridine treatment. Moreover, the intermediate allyl 2,2-dinitropropyl carbonate is not shock-sensitive and can be highly purified in conventional equipment. Hazardous operations involving sensitive difluoraminoalcohol are avoided, and the handling of difluoramino compounds is deferred to the last step which can be conducted safely, for example, in a pipeline reactor.

2,3-Bis(difluoramino)propyl 2,2-dinitropropyl carbonate is utilized with advantage as a plasticizer of polymeric binders for solid propellant systems. It is especially useful when combined with poly-[1,2-bis(difluoramino)-2,3-epoxypropane], which is a family of hydroxylterminated polyethers with a repeating unit of

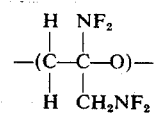

and is described in copending application of Walter L. Petty, U.S. Ser. No. 660,545, filed July 12, 1967. A particularly desirable composition is that wherein the weight ratio of 2,3-bis(difluoramino)propyl 2,2-dinitropropyl carbonate plasticizer to poly[1,2-bis(difluoramino)-2,3-epoxypropane] binder is about 1:1, i.e., about 50/50 wt %. Propellants formulated from 2,3-bis(difluoramino)propyl 2,2-dinitropropyl carbonate-plasticized poly[1,2-bis(difluoroamino)-2,3-epoxypropane] exhibit superior properties such as high true tensile values between +75° and −20°F, high true elongation, high impact values, significant reduction in burning rate, and such formulations yield propellant systems which are highly stable thermally. Other commonly used difluoramino plasticizers do not contain enough oxidizing groups for complete self-combustion and must rely upon oxygen from ammonium perchlorate or other oxidizer to make up for this deficiency. The 2,3-bis(difluoramino)propyl 2,2-dinitropropyl carbonate plasticizer of the invention having a higher concentration of active oxidizing groups minimizes this deficiency when combined with poly-[1,2-bis(difluoramino)-2,3-epoxypropane] and produces a higher performance potential when formulated into advanced propellant systems, for example, those using metal hydrides as fuel.

In the following examples all molecular weights of polymers are determined by vapor phase osmometer.

EXAMPLE 1

To 1,075 g of a 23.0 percent solution of 2,2-dinitropropanol (247 g, 1.65 moles) in 1,2-dichloroethane was added, during 15 minutes 138 g (1.75 moles) pyridine, the temperature being maintained at −10°C by an acetone — Dry Ice bath. To this was added, during a 2 hour period a solution of 208 g (1.73 moles) allyl chloroformate in 250 ml 1,2-dichloroethane. The reaction mixture was kept at −10°C throughout the addition and for 3 hours thereafter, then allowed to warm up to ambient temperature.

The mixture was diluted with 1,800 ml hexane then washed three times with 2-liter portions of water, once with 0.1 N hydrochloric acid, three times with 4 percent aqueous sodium bicarbonate solution, and twice with water. After drying with anhydrous magnesium sulfate and stripping off solvent under vacuum there remain 342 g light amber liquid. The allyl 2,2-dinitropropyl carbonate product was rectified by topping on a 1 inch X 2 foot Vigreux distillation column operating at 20 microns pressure and at a high reflux ratio, then flash distilling the bottoms. Gas chromatographic analysis showed that the bottoms were free from low boiling components when about 20 percent had been topped. The allyl 2,2-dinitropropyl carbonate product, a colorless liquid weighing 280 g (72.8 percent), distilled at 96°C at 20 microns. The proton nuclear magnetic resonance (NMR) spectrum was in agreement with the assigned structure. No impurities were detected.

Analysis Calculated for: $C_7H_{10}N_2O_7$: C, 35.8; H, 4.3; N, 11.9.

Found: C, 36.1; H, 4.4; N, 11.1.

EXAMPLE 2

A solution of 3.45 g of allyl 2,2-dinitropropyl carbonate in 12 ml of 1,2-dichloroethane was heated in a stirred pressure vessel to 85°C for 5 hours under 500 psig of tetrafluorohydrazine. Gas-liquid chromatographic analyses showed the absence of starting material. The solvent was stripped off on a rotating evaporator, and the liquid residue distilled at 125°C and <0.1 mm in a short-path micro Claisen still. 3.99 Grams (80 percent) of 2,3-bis(difluoramino)propyl 2,2-dinitropropyl carbonate, a slightly viscous, clear, colorless liquid, was collected. Proton and fluorine NMR spectra were completely consistent with the assigned structure and did not show any detectable impurities.

Analysis Calculated for: $C_7H_{10}N_4O_7F_4$: C, 24.8; H, 3.0; N, 16.5; F, 23.0.

Found: C, 25.7; H, 3.1; N, 16.0; F, 22.9.

Whereas the impact sensitivity of commonly used energetic plasticizers varies from about 2 to about 15 kg-cm as measured by the Olin-Mathieson closed-cup impact testing method where increasing values indicate increasing stability (e.g., nitroglycerin has a value of 2), the measured value for 2,3-bis(difluoramino)propyl 2,2-dinitropropyl carbonate is about 75 kg-cm.

Commonly used energetic plasticizers are friction-sensitive, i.e., they detonate even in the absence of grit in the Esso screw friction testing method. 2,3-Bis(difluoramino)propyl 2,2-dinitropropyl carbonate does not detonate in the presence of diamond grit in the Esso screw friction testing method, i.e., it gives a negative friction sensitivity test result.

EXAMPLE 3

A propellant formulation of the following description was prepared:

Binder: Poly[1,2-bis(difluoramino)-2,3-epoxypropane], mol wt. about 3700: 19.86 wt%
Plasticizer: 2,3-Bis(difluoramino)propyl 2,2-dinitropropyl carbonate: 19.86 wt%
Oxidizer: Ammonium perchlorate: 46.28 wt%
Fuel: Aluminum: 14.00 wt%
Cure: Binder(OH)/triol[1]) (OH) equivalents ratio OH/NCO[2]) equivalents ratio: 1.0/0.6:1.0/1.0

1) Added as 1,2,6-hexanetriol.
2) Added as 3,3'-dimethyldiphenylmethane-4.4'-diisocyanate.

The measured tensile values and elongation of the above propellant at various temperatures are given in the following table:

| Temperature, °F | Tensile, psi | Elongation, % |
|---|---|---|
| 75 | 90.7 | 52.8 |
| 0 | 521.0 | 29.3 |
| −20 | 855.0 | 13.5 |

The elongation at 75°F of a similar propellant formulation utilizing control plasticizer, 1,2,3-tris[1,2-bis(difluoramino)ethoxy]-propane, in place of 2,3-bis(difluoramino)propyl 2,2-dinitropropyl carbonate is <46 percent.

EXAMPLE 4

A propellant formulation of the following description was prepared:

| Ingredient | Wt. % |
|---|---|
| Poly[1,2-bis(difluoramino)-2,3-epoxypropane], mol wt. about 3700 | 17.87 |
| 2,3-Bis(difluoramino)propyl 2,2-dinitropropyl carbonate | 17.87 |
| 1,2,6-Hexanetriol | 0.36 |
| 3,3'-Dimethyldipheylmethane-4,4'-diisocyanate | 2.98 |
| Aluminum | 14.00 |
| Ammonium perchlorate | 46.28 |

The measured burning rate of the above propellant is 1.05 in./sec at 1,000 psi, which value is significantly lower than the burning rate of 1.20 in./sec at 1,000 psi of a similar propellant utilizing the control plasticizer of Example 3 in place of 2,3-bis(difluoramino)propyl 2,2-dinitropropyl carbonate.

EXAMPLE 5

A 277-g sample of allyl 2,2-dinitropropyl carbonate was put through a continuous difluoramination unit under the following conditions: 0.5 hour at 96°C and 1.5 hours at 105°C, 100 percent excess tetrafluorohydrazine at 350 psig, feed 10% wt allyl 2,2-dinitropropyl carbonate in 1,2-dichloroethane. Samples were taken every hour and each sample was worked up by being stirred 2 hours with an approximately equal volume of about 4% wt aqueous sodium bicarbonate solution followed by a 3-hour treatment with fresh bicarbonate, then dried by treatment for 1 hour with 1 percent of 13x molecular sieve and filtered. The resulting dichloroethane solution was treated by stirring for 24 hours with a mixture of 1 percent 13x molecular sieve and 1 percent acidic ion exchange resin (Amberlyst 15) then adding another 1 percent each of sieve and resin and stirring an additional 24 hours. The dichloroethane was then removed by stripping at reduced pressure yielding a total production of 379.4 g (94.5 percent yield) of 2,3-bis (difluoroamino)propyl 2,2-dinitropropyl carbonate. The measured value of impact sensitivity of this carbonate is about 75 kg-cm.

We claim as our invention:

1. 2,3-Bis(difluoramino)propyl 2,2-dinitropropyl carbonate.

2. The process of producing 2,3-bis(difluoramino)propyl 2,2-dinitropropyl carbonate by (a) reacting allyl 2,2-dinitropropyl carbonate with tetrafluorohydrazine in the presence of an inert, water-immiscible solvent, (b) washing the resulting product solution of (a) with aqueous sodium bicarbonate, (c) treating the resulting product solution of (b) by contacting it with an acidic ion exchange resin and a molecular sieve, and (d) recovering 2,3-bis(difluoramino)propyl 2,2-dinitropropyl carbonate by separating it from the inert, water-immiscible solvent.

3. The process of claim 2 wherein the reaction of step (a) is conducted in the presence of an inert water-soluble solvent which is exchanged for an inert, water-immiscible solvent prior to proceeding with step (b).

4. The composition consisting essentially of a mixture of poly[1,2-bis(difluoramino)-2,3-epoxypropane] and 2,3-bis(difluoramino)-propyl 2,2-dinitropropyl carbonate.

5. The composition of claim 4 wherein the weight ratio of poly[1,2-bis(difluoramino)-2,3-epoxypropane] to 2,3-bis(difluoramino)-propyl 2,2-dinitropropyl carbonate is about 1:1.

* * * * *